United States Patent [19]

Piggott

[11] 3,919,779

[45] Nov. 18, 1975

[54] THICKNESS GAUGE DEVICES

[75] Inventor: David C. Piggott, Burlington, Canada

[73] Assignee: PCL Industries Limited, Willowdale, Canada

[22] Filed: Sept. 4, 1974

[21] Appl. No.: 503,150

[52] U.S. Cl. .............................. 33/147 L; 33/143 R
[51] Int. Cl.² .......................................... G01B 5/06
[58] Field of Search .......... 33/147 L, 147 D, 143 R, 33/147 R, 148 R, 149 R, 148 D, 147 N, 141 B, 174 R

[56] References Cited
UNITED STATES PATENTS

| | | | |
|---|---|---|---|
| 871,902 | 11/1907 | Wilson | 33/141 B |
| 2,073,365 | 3/1937 | Darlington | 33/148 R |
| 2,848,816 | 8/1958 | O'Neill | 33/148 R |

Primary Examiner—Richard E. Aegerter
Assistant Examiner—Willis Little
Attorney, Agent, or Firm—Hirons & Rogers

[57] ABSTRACT

A thickness gauge intended for measuring the thickness of moving multi-ply bodies, such as an extruded plastic tube, consists of two parallel connected arms carrying at corresponding ends a respective one of a pair of roller bearings that are urged toward each other by the resilience of the arms. A mechanical movement gauge is mounted on the arms at a location at which the amount of spread apart movement produced by the body between the rollers is a whole number fraction of the actual movement apart of the rollers, so that the gauge will read directly the thickness of an individual ply, avoiding the need for transposition or calculation by the operator.

5 Claims, 2 Drawing Figures

U.S. Patent    Nov. 18, 1975    3,919,779
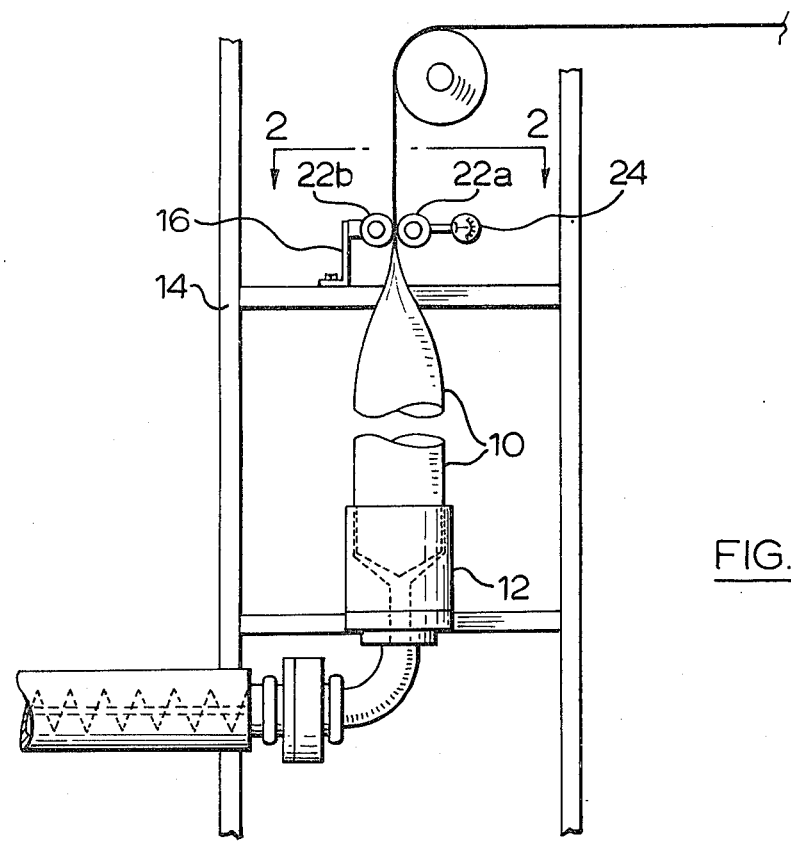
FIG. 1
FIG. 2
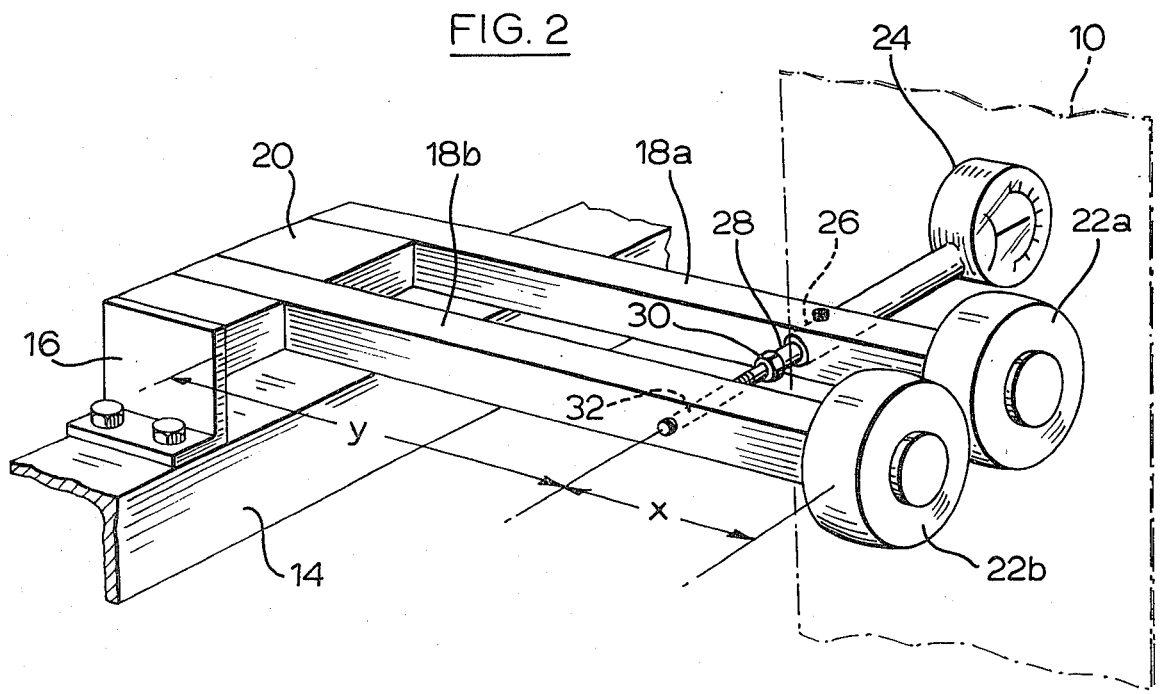

THICKNESS GAUGE DEVICES

FIELD OF THE INVENTION

The present invention is concerned with improvements in or relating to thickness gauge devices, and especially to such a device that is capable of providing a direct reading of the wall thickness of a moving thin-walled tube of flexible material, e.g., an extruded plastic material.

REVIEW OF THE PRIOR ART

It is a constant endeavour in the field of instrumentation to provide measuring devices that are simple and robust, and yet effective for the intended purpose. For example, in the production of a thin-walled tube of extruded plastic material it is necessary to maintain accurate control of the wall thickness of the tube for optimum use of the plastic material, and to ensure that the products made therefrom will meet commercial specifications as to minimum wall thickness.

FIELD OF THE INVENTION

It is therefore an object of the invention to provide a new thickness gauge device for the measurement of the wall thickness of a moving thin-walled tube of flexible material.

In accordance with the present invention there is provided a thickness gauge device comprising a pair of cooperating arm members rigidly connected together and having spaced resilient coextending parts, a pair of opposed roller members mounted respectively on the coextending parts of the arm members for rotation about parallel axes, said pair of roller members being urged toward each other by the resilience of coextending parts to embrace a body whose thickness is to be measured thereby, and moved apart by flexing of the coextending parts when the body is therebetween, to produce a corresponding apart movement of the coextending parts, and a gauge device mounted on the coextending parts to measure the said apart movement thereof produced by the said body.

DESCRIPTION OF THE DRAWINGS

A particular preferred embodiment of the invention will now be described, by way of example, with reference to the accompanying diagrammatic drawing, wherein:

FIG. 1 is a side elevation illustrating the formation of an extruded plastic tube and the manner of use of the gauge device of the invention in connection therewith, and FIG. 2 is a perspective view generally in the direction of the arrows 2—2 in FIG. 1 and drawn to a larger scale.

DESCRIPTION OF THE PREFERRED EMBODIMENT

The contact gauge device of the invention is shown in use for the measurement of the wall thickness of a tube 10 of plastic material as it issues from the forming die 12 of a plastic extruder (not shown), and as it passes upwards through the usual cooling and winding tower 14. As will be understood by those skilled in the art, the gauge is disposed at a location along the length of the tube at which it has cooled sufficiently not to be marked by the physical contact of the gauge therewith.

The gauge proper is mounted on a base member 16, by which it can be fastened to the tower frame 14 and adjusted in its position thereon to contact the tube 10 at an appropriate location. The gauge itself consists of two straight elongated arm members 18a and 18b fastened at corresponding ends to a spacer block 20, so that they extend in spaced, parallel relation to each other. Two ball bearings 22a and 22b are mounted respectively on the ends of the arms with their axes of rotation parallel to one another. The external cylindrical surfaces of the bearings are convex, and in the absence of a body between them, they engage each other over a relatively narrow contact surface under a gentle urging, which in this embodiment is due to the resilience of the material of the arms.

A mechanical gauge 24, such as the Model 212 gauge sold by D.C. Armes Co. of Waltham, Mass., is mounted in a bore 26 in one of the arms, shown as the arm 18a, with its operating pin 28 facing toward the other arm 18b. A bridging pin 30 is fixed in a bore 32 in the other arm 18b and bridges the gap between the two arms to contact the pin 28, the two pins 28 and 30 being coaxial with one another. The gauge is arranged for "reverse reading," so that it reads zero when the rollers 22 are in contact with one another, and gives a positive reading as they are spread apart by the body.

The distance $x$, which is the distance between the coaxial axes of the pins 28 and 30 and the plane in which the rollers contact each other, is related to the distance $y$, which is the distance between the pin axes and the plane in which the arm members are effectively joined to each other, so that the spread apart movement of the pins 28 and 30 along their axes is a corresponding whole number fraction of the movement apart of the rollers 22 upon the passage of a body between them. In the case of a body consisting of a plurality of plies of uniform thickness, such as the two-ply tube specifically illustrated, the gauge can be made to read directly the thickness of a single ply by making the whole number fraction equal to one half.

The arms can be provided with similar pairs of bores 26 and 32 at other "whole number fraction" locations for use with other multi-ply bodies.

In this particular embodiment the relationship between the lengths $x$ and $y$ is not itself a "whole number fraction," since the arms are rigidly connected together at their ends and the spread apart movement of the bearings 22 is dependent upon the elasticity of the arms, involving a square law relation between length and transverse movement. In other embodiments the arm members can instead be hinged or pivoted to one another and urged toward each other by a separate spring, in which case the distance $x$ and $y$ would have a linear relation to one another.

I claim:

1. A thickness gauge device comprising a pair of cooperating arm members rigidly connected together and having spaced resilient coextending parts, a pair of opposed roller members mounted respectively on the coextending parts of the arm members for rotation about parallel axes, said pair of roller members being urged toward each other by the resilience of said coextending parts to embrace a body whose thickness is to be measured thereby, and moved apart by flexing of the coextending parts when the body is therebetween, to produce a corresponding apart movement of the coextending parts, and a gauge device mounted on the coextending parts to measure the said apart movement thereof produced by the said body.

2. The invention as claimed in claim 1, and for the direct measurement of the thickness of an individual ply of a multi-ply body constituted by a plurality of like plies wherein the gauge device is mounted on the coextending parts at a location such that the said apart movement thereof is a whole number fraction of the movement apart of the roller members, with the said whole number equal to the number of plies, so that the device reads directly the thickness of an individual ply.

3. The invention as claimed in claim 2, wherein the movement measuring gauge device is arranged for reverse reading and is mounted on one arm member with its operating pin engaged by a bridge pin extending from the other arm member.

4. A thickness gauge device for direct measurement of the thickness of an individual ply of a multi-ply body constituted by a plurality of like plies, the device comprising a pair of cooperating connected arm members having spaced resilient coextending parts, a pair of opposed roller members mounted respectively on the coextending parts of the arm members for rotation about parallel axes, urged toward each other by the coextending parts to embrace a body whose ply thickness is to be measured thereby, and moved apart by the body therebetween, to produce a corresponding apart movement of the coextending parts, and a gauge device mounted on the coextending parts to measure the said apart movement thereof produced by the said body, the gauge device being mounted on the coextending parts at a location such that the said apart movement thereof is a whole number fraction of the movement apart of the roller members, with the said whole number equal to the number of plies, so that the device reads directly the thickness of an individual ply.

5. The invention as claimed in claim 4, wherein the movement measuring gauge device is arranged for reverse reading and is mounted on one arm member with its operating pin engaged by a bridge pin extending from the other arm member.

* * * * *